United States Patent [19]

Takada

[11] 4,296,943
[45] Oct. 27, 1981

[54] DEVICE FOR HOLDING A PASSIVE VEHICLE RESTRAINT BELT AT A RESTRAINING POSITION

[76] Inventor: Juichiro Takada, 3-12-1 Shinmachi Setagayaku, Tokyo, Japan

[21] Appl. No.: 125,541

[22] Filed: Feb. 28, 1980

[30] Foreign Application Priority Data

Mar. 2, 1979 [JP] Japan .................................. 54-023431

[51] Int. Cl.³ ............................................ B60R 21/10
[52] U.S. Cl. ................................................. 280/804
[58] Field of Search ......................... 280/804, 802, 803

[56] References Cited

U.S. PATENT DOCUMENTS

| 3,827,713 | 8/1974 | Sakurai | 280/803 |
| 3,842,929 | 10/1974 | Wada | 280/804 |
| 3,900,078 | 8/1975 | Otani | 280/804 |

Primary Examiner—Robert R. Song
Attorney, Agent, or Firm—Brumbaugh, Graves, Donohue & Raymond

[57] ABSTRACT

The sheath of a drive wire that moves a moving belt anchor of a passive seat belt system along a guide rail consists of two sections joined by a resilient telescopic coupling that allows the sheath to shorten and absorb the energy when the anchor stops at the restraint position.

6 Claims, 6 Drawing Figures

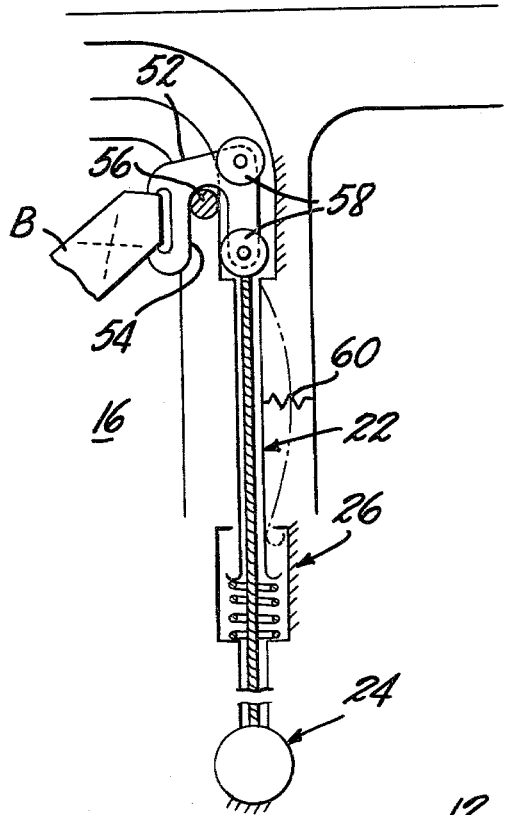
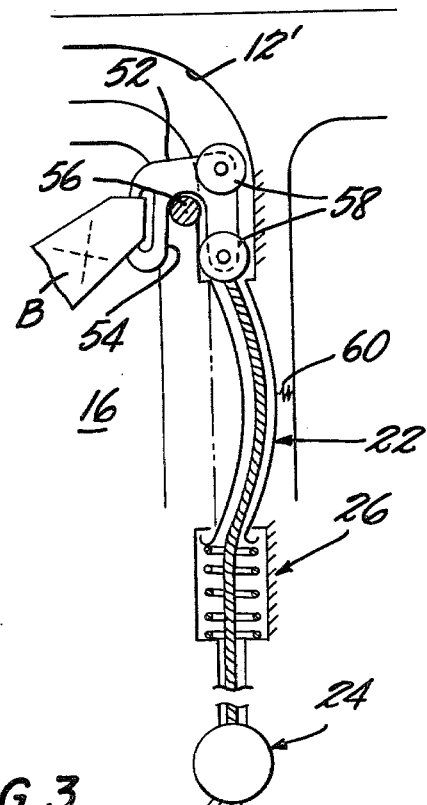
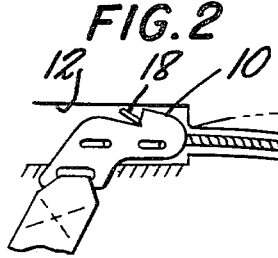
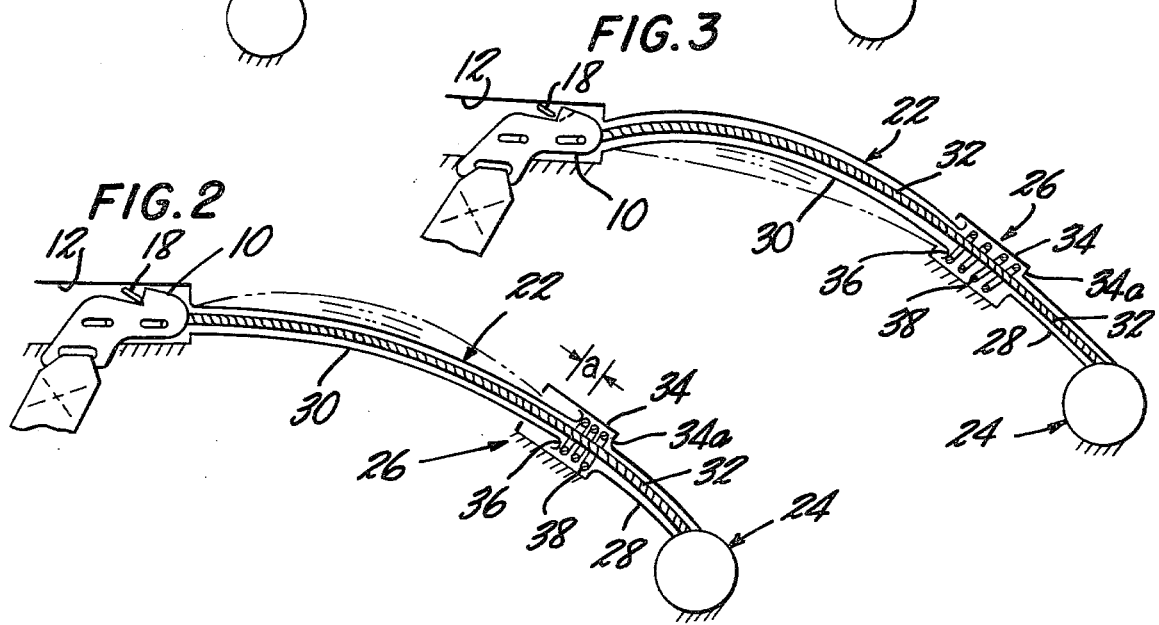

DEVICE FOR HOLDING A PASSIVE VEHICLE RESTRAINT BELT AT A RESTRAINING POSITION

FIELD OF THE INVENTION

This invention relates to a device that holds a passive seat belt at a restraining position and which absorbs energy when a reciprocating seat belt anchor is moved to the restraining position.

BACKGROUND OF THE INVENTION

Seat belt systems of the type to which the present invention relates employ a seat belt secured at one end to an anchor which is slidably mounted on a guide rail. The anchor is connected by a drive wire to a motor or mechanical motion amplifier which operates in response to the opening and closing of the vehicle door. When the vehicle door is closed, the anchor is driven to a restraint position and holds the belt in an occupant-restraining configuration. When the door is opened, the anchor is moved to a release position and holds the belt in a releasing configuration.

It is desirable in such systems that the belt anchor be positively held at the restraint position by some sort of anchor-locking device, and the present inventor has, accordingly, invented such locking devices and disclosed them in U.S. Patent Application Ser. No. 044,196, filed May 31, 1979, and entitled "Lockable Moving Belt Anchor for Passive Vehicle Occupant Restraint Belt Systems."

When a moving anchor of either the type described in the aforementioned application of some other type arrives at the restraint location, it must stop fairly close to a specified position, particularly when the anchor arrangement includes a locking device for holding it in the restraint location. Because of normal manufacturing tolerances and changes that occur in any mechanism due to temperature, friction, wear and the like, it is difficult with known drive arrangements and control systems to stop the anchor in a precise location. Perhaps the best way to ensure proper location of the moving anchor is to include a stop and to arrange the motor or other drive device and the controls for that device in a manner that ensures that the moving anchor will be driven into engagement with the stop. This means, however, that when the anchor arrives at the stop, the drive device is abruptly stopped and is subjected to an undersirable and possibly damaging shock.

In addition to the problems that can arise due to harmful shocks on the drive system, there can also be problems with some types of lockable moving anchors involving release of the lock mechanism and movement of the moving anchor away from the restraint location. Some moving anchor-like mechanisms have gravity-actuated locking pawls that engage a locking shoulder on the moving anchor. When a vehicle having such a mechanism travels on a rough road, the pawl may shift from locking engagement, and the anchor may creep away from the restraint location and from a position in which the pawl can re-engage the shoulder.

SUMMARY OF THE INVENTION

There is provided, in accordance with the present invention, an improvement in a passive vehicle restraint belt system of the type that includes a moving anchor driven by a drive device between an occupant-restraining location and an occupant-releasing location, the drive system including a sheathed drive wire for transmitting motion from the drive device to the moving anchor. In particular, the improvement involves making the sheath for the drive wire in two sections and connecting the two sheathed sections to each other by a resilient lost-motion coupling that normally urges the sections axially away from each other but allows them to move toward each other to shorten the effective length of the sheath. In a preferred embodiment, the lost-motion coupling comprises a tubular member fastened to the end of one of the sheath sections, a fitting on the end of the other sheath section that is received for axial movement within the tubular member, and a compression spring received within the tubular member and interposed between the fitting and a shoulder within the tubular member.

The lost-motion coupling in an extended configuration establishes a certain predetermined length of wire within the sheath that is somewhat greater than the length of the wire within the sheath when the coupling is collapsed. Accordingly, as the drive system pulls the moving anchor from the releasing location to the restraining location, the coupling maintains the sheath extended to the first-mentioned, greater length. Upon arrival of the anchor at the restraint location, it is abruptly stopped in the desired position, but the coupling permits the drive device to overrun slightly and to decelerate without a harmful shock. Instead, the coupling absorbs the energy and motion of a small additional movement of the drive wire, the effective length of which between the anchor and the drive device is reduced commensurate with the reduced effective length of the sheath upon collapse of the resilient lost-motion coupling. Accordingly, the invention solves the problem of shock on the drive arrangement when the anchor arrives and stops at the restraint location.

The friction and inertia of conventional drive systems, together with the mechanical advantage of reduction gears or levers employed in such systems, exert a continuous force on the drive wire and anchor tending to hold them in proper position, but vibration due to travel on rough roads can cause the drive to creep and allow the moving anchor to move away from the restraint location. Moreover, there may be some backwash in the drive system which can allow the wire to lengthen. The present invention accommodates small increases in the length of the drive wire due to these and other possible causes by increasing the effective length of the sheath between the drive device and the anchor and maintaining a resilient force on the wire to maintain tension in it and ensure that the moving anchor does not creep away from the restraint location if the locking device should vibrate and periodically release the anchor.

The resiliency of the lost-motion coupling may be supplemented by providing a tension spring connected under tension at an intermediate location along one of the sheaths and an adjacent point on the vehicle. The force of the tension spring should be less than the force of the compression spring of the lost-motion coupling. The tension spring pulls the sheath section to one side and supplements the function of the resilient lost-motion coupling in maintaining tension in the drive wire.

For a better understanding of the invention, reference may be made to the following description of exemplary embodiments, taken in conjunction with the figures of the accompanying drawings.

DESCRIPTION OF THE DRAWINGS

FIG. 2 is an elevational view of the moving anchor system of FIG. 1 as it appears when the anchor is abruptly stopped at the restraining position;

FIG. 3 is a view similar to FIG. 2 of the anchor system as it appears immediately after the anchor has stopped at the restraining position;

FIG. 4 is an elevational view of another moving anchor system embodying the present invention;

FIG. 5 is a view similar to FIG. 4 except that the device is shown immediately after the anchor has stopped at the restraining position.

DESCRIPTION OF EXEMPLARY EMBODIMENTS

Figure 1:
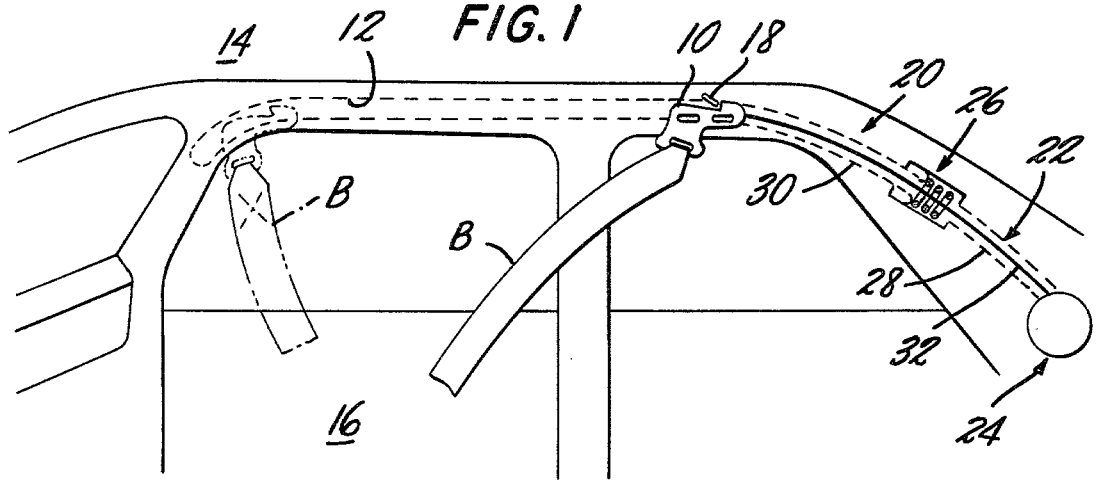
FIG. 1 is a schematic pictorial view of the interior of a car having one embodiment of the seat belt system according to the present invention.

In the embodiment of the invention shown in FIGS. 1 to 3, a shoulder belt B leads from a belt retractor adjacent the inboard, lower, rearward portion of the vehicle seat upwardly and outwardly to a moving anchor 10 which slides back and forth along a track 12 mounted at the edge of the vehicle roof 14 above the door 16. A locking device, which is represented schematically by a locking pawl 18, locks the anchor 10 at a rearward position along the track above, behind and outboard of the occupant of the seat and holds the belt B in an occupant-restraining configuration (solid lines in FIG. 1). The moving anchor 10 is transferred between the rearward restraining location and a forward releasing location (phantom lines in FIG. 1) by a drive system 20 which includes a sheathed drive wire 22 and a drive device 24, such as a gear-reduced electric motor. The motor 24 is controlled in a known manner, such as by switches in the door and switches associated with the drive wire so that when the door is opened the moving anchor is driven foward to the releasing location at the front of the track, and when the door is closed the moving anchor is driven back to the releasing location. As mentioned above, it is difficult to design and install the belt transfer system in a manner which ensures stopping the moving anchor at the restraint location for locking without the shock to the drive system. Accordingly, a system embodying the present invention includes a resilient lost-motion coupling 26 connecting two sheath sections 28 and 30 that together constrain the drive wire 32 which transmits motion from the drive device 24 to the moving anchor 10.

Referring to FIGS. 2 and 3, the wire 32 of the sheathed drive wire 22 (which is preferably a racked wire) leads from the output of the drive device 24 and is suitably connected to the moving anchor 10. The sheath section 28 is fastened to the vehicle body or to the housing of the drive device at a location close to the output of the drive device. The other end of the sheath section 28 is fastened to a small tube 34 which is suitably secured to the vehicle body along the path of the drive wire 32. The other sheath section 30 is fastened at one end to the vehicle at a location adjacent the rearward end of the track 12 and is provided at the other end with a fitting 36 that is slidably received within the tube 34. A compression spring 38 is installed under compression within the tube 34 between the fitting 36 and a shoulder 34a in the tube 34, such as an annular end wall of the tube.

Normally, the spring 38 pushes the sheath section 30 into the position shown in FIG. 3 in which the effective length of the drive wire 32 between the output of the drive device 24 and the rearward end of the track 12 is at a maximum. When the drive system pulls the anchor to the restraint location at the rearward end of the track, it is so constructed, installed and controlled so as to pull in a small additional length of drive wire 32 equal to the displacement represented by the dimension "a" in FIG. 2 of the end fitting 36 on the sheath section 30 into the tube 34. The compression of the spring 38 absorbs the motion and energy of pulling the wire 22 to a shorter effective length, as compared to the maximum effective length shown in FIG. 3, thereby minimizing the shock on the drive device and other parts of the moving anchor system and ensuring that the moving anchor 10 will arrive and remain at the restraint location for locking by the locking device 18.

After the anchor has been stopped and locked at the restraint location, any backlash in the drive device or any creep resulting from vibration or other sources that tends to slacken the drive wire 32 will be taken up by lengthening of the sheath by extension of the coupling 26 (compare FIGS. 2 and 3). In other words, the resilient coupling 26 maintains tension in the wire 32 by lengthening the effective length of the sheath, and the tension holds the moving anchor 10 at the restraint location even though the locking device might release from time to time as the vehicle runs over a rough road.

In the embodiment shown in FIGS. 4 and 5 of the drawings, the guide track 12' curves downwardly into the upper end of the center pillar 50 of the vehicle at a location adjacent the upper rear corner of the door 16. The outboard end of the belt B is secured to a moving anchor 52 which has a slot 54 that embraces a strong anchor pin 56 fastened to the pillar 50. The moving anchor includes rollers 58 which ride along the track. The moving anchor and track arrangement shown in FIGS. 4 and 5 are described and shown in greater detail in the aforementioned U.S. Application Ser. No. 044,196, and reference may be made to that application.

The drive system is the same in all respects as the one shown in FIGS. 2 and 3 and described above, and the same reference numerals are, therefore, applied. As a further feature, however, the embodiment of FIGS. 4 and 5 includes a tension spring 60 connected between the sheath section 30 and the center pillar. As is apparent from comparing FIGS. 4 and 5, the spring 60 pulls the sheath section 30 to one side when the coupling 26 extends to lengthen the effective distance along the sheath between the drive device 24 and the moving anchor 52. The force of the spring 60 is less than the force of the spring 38. The tension force of the spring 60 supplements the compression force of the spring 38 in absorbing energy when the drive wire 32 is pulled taut to its shortest effective length (FIG. 4) and in maintaining tension in the drive wire (see FIG. 5).

Figure 6:
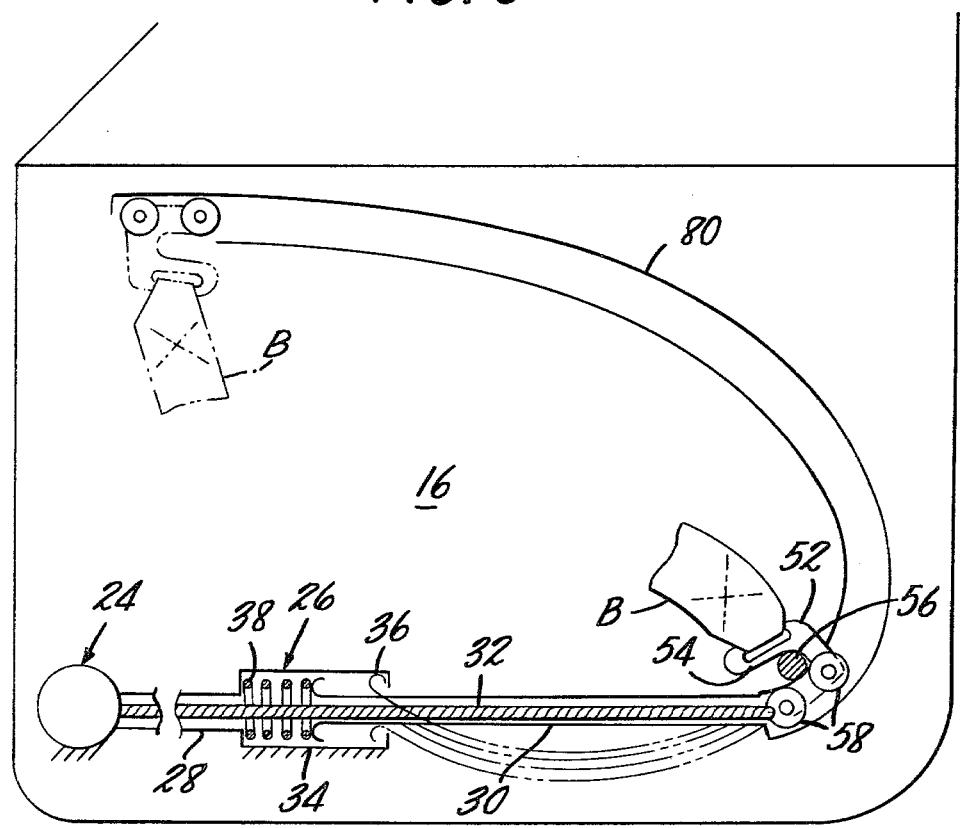
FIG. 6 is an elevational view of another embodiment of the present invention.

The present invention can be employed with moving anchors installed in other locations in the vehicle. For example, as shown in FIG. 6, a moving anchor can be used to transfer the outboard end of a lap belt between a restraint location at the lower rear corner of the vehicle door 16 and a release location near the front of the door. A curved track 80 is installed in the door and guides a moving anchor along a predetermined path between the restraint and release locations. The moving anchor and the components of the drive system of FIG. 6 are the same as those shown in FIGS. 4 and 5 and described above. Accordingly, the same reference numerals are applied and the structure and mode of operation is readily apparent from the foregoing description and need not be repeated. The drive arrangement for the system shown in FIG. 6 is well suited for use of a mechanical motion amplifier instead of an electric motor to drive the sheathed wire system. Such devices are recognized in the art and involve amplifying the opening and closing motions of the vehicle door.

Thus, the invention provides a simple, low-cost effective way of reducing the shock and noise produced when a moving anchor is stopped at a restraint location by absorbing energy and motion when a drive wire is over-retracted to ensure that the anchor reaches the proper position. The present invention also solves the problem of the anchor creeping away from the restraint location, should the locking device unlock from time to time.

I claim:

1. In a passive vehicle restraint belt system which includes a moving anchor that is coupled by a sheathed drive wire to a drive device for moving the anchor along a predetermined path in the vehicle between an occupant-restraining location and an occupant-releasing location, the sheath of the drive wire extending from adjacent the drive device to adjacent a stop means at the occupant-restraining location of the moving anchor, the improvement wherein the sheath of the drive wire is composed of two sections, one of which is affixed to a portion of the vehicle at a location adjacent the occupant-restraining location of the moving anchor, the other of which is affixed to a portion of the vehicle at a location adjacent the drive device and at least one of which is non-rigid and deflectable, and the two sections are connected to each other by a resilient lost-motion coupling that normally urges the sections axially away from each other to increase the effective length of the sheath by deflecting at least the deflectable section thereof but allows them to move toward each other to shorten the effective length of the sheath.

2. The improvement according to claim 1 wherein the coupling comprises a tubular member fastened to the end of one sheath section, a fitting on the end of the other sheath section which is received for axial movement within the tubular member, and a compression spring received within the tubular member under compression between the fitting and a shoulder within the tubular member.

3. The improvement according to claim 1 or claim 2 and further comprising a tension spring coupled under tension between a portion intermediate the ends of the deflectable sheath section and an adjacent portion of the vehicle for pulling such section to one side, the force of the tension spring being less than the force of the compression spring.

4. The improvement according to claim 1 or claim 2 wherein the moving anchor engages a locking member at the restraining location.

5. The improvement according to claim 1 or claim 2 wherein the drive device includes an electric motor.

6. The improvement according to claim 1 or claim 2 wherein the drive device includes a mechanical motion amplifier coupled between the door and the vehicle body and responsive to opening and closing motions of the door.

* * * * *